United States Patent Office
3,538,199
Patented Nov. 3, 1970

3,538,199
CONTINUOUS PROCESS FOR THE PRODUCTION OF HEXAMETHYLENETETRAMINE
Samuel Weiss, River Edge, and David X. Klein, Upper Montclair, N.J., assignors to Tenneco Chemicals, Inc., a corporation of Delaware
No Drawing. Filed Dec. 31, 1968, Ser. No. 788,338
Int. Cl. B01j 2/04
U.S. Cl. 264—6                                10 Claims

ABSTRACT OF THE DISCLOSURE

Substantially anhydrous, free-flowing, granular hexamethylenetetramine is prepared by continuously introducing an aqueous solution of formaldehyde and gaseous ammonia into a reaction zone in which they are reacted at 50°–90° C. at a pH of 7.5 to 8.0 for a period of about 1 minute to 10 minutes, continuously withdrawing the aqueous solution of hexamethylenetetramine from the reaction zone and feeding it to a spray drier. The spray-dried product, which contains less than 1% of water, is then compacted and granulated.

---

This invention relates to a process for the production of hexamethylenetetramine. More particularly, it relates to a process wherein the reaction of formaldehyde with ammonia to form hexamethylenetetramine and the isolation of a substantially anhydrous, free-flowing, granular product are carried out in a continuous manner.

Hexamethylenetetramine is produced commercially by the reaction of formaldehyde with ammonia in aqueous solution. The reaction that takes place may be represented by the equation

$$6CH_2O + 4NH_3 \rightarrow C_6H_{12}N_4 + 6\ H_2O + \text{heat}$$

The solution of hexamethylenetetramine that is produced is concentrated by vacuum evaporation until crystallization of the product occurs. The hexamethylenetetramine crystals are separated by filtration or centrifugation, washed, and dried. The mother liquor and washings, which contain dissolved hexamethylenetetramine and various reaction by-products, are recycled to the evaporator to recover additional quantities of the product. To avoid excessive build-up of soluble impurities in the evaporator, it is usually necessary to discard portions of the mother liquor periodically.

A number of processes have been disclosed for the production of hexamethylenetetramine. Those in which the process operations are performed in a batchwise or semicontinuous manner require attention and handling, which render the conventional methods costly. The continuous processes that have been disclosed generally call for the continuous reaction of formaldehyde with ammonia and continuous concentration of the reaction liquor to cause the product to precipitate. These processes, like the batch and semicontinuous processes, include steps in which the product is separated from the reaction liquor, washed, and dried and the mother liquor is recycled. One such process calls for the use of an organic liquid to serve as the reaction medium and to assist in the dehydration of the product, while others call for the use of gaseous formaldehyde. Still others make the process continuous by carrying out the reaction at elevated temperatures that also promote the formation of by-products. While these processes are often more economical to operate than the previously-used batch and semicontinuous processes, they do not fulfill the requirement for a process that is economical to operate and that gives a substantially quantitative yield of a dry, free-flowing, relatively-pure product.

In accordance with the present invention, it has been found that hexamethylenetetramine can be prepared efficiently and economically by a process in which aqueous formaldehyde that has a low cation content and ammonia are introduced continuously into a reaction zone and reacted under specified conditions for from 1 minute to 10 minutes to form an aqueous solution of hexamethylenetetramine which is then spray dried. The spray-dried product, which contains less than 1 percent of water, is then compacted and granulated to yield a substantially anhydrous, dust-free, free-flowing product. This product meets all of the quality requirements that have been established for hexamethylenetetramine. This process, which gives an almost quantitative yield without the recycling of liquors, is far simpler and less costly to operate than the previously-known procedures for the production of hexamethylenetetramine.

In the practice of this invention, gaseous ammonia and an aqueous formaldehyde solution that has been prepared from deionized water or distilled water simultaneously and continuously are introduced into a reaction zone where the reaction mixture is maintained at a temperature in the range of 50° C. to 90° C. and a pH in the range of 7.0 to 8.0 and preferably of 7.5 to 8.0 for a period of 1 minute to 10 minutes and in most cases 2 minutes to 5 minutes. The formaldehyde solution that is used contains from about 30 percent to 50 percent and preferably about 45 percent by weight of formaldehyde. The flow rates of the formaldehyde solution and the gaseous ammonia into the reaction zone are such that substantially stoichiometrically equivalent amounts of the reactants are introduced. The use of these amounts insures very high yields based on both reactants. An excess of about 0.5 percent to 1.5 percent by weight of formaledehyde may be used to minimize by-product formation.

The aqueous solution leaving the reaction zone, which contains about 25 percent to 35 percent by weight of hexamethylenetetramine and which has a pH of about 7.5 to 8.0, is fed into a spray dryer in which it is atomized and contacted with a stream of heated inert gas until a dry solid product is obtained.

Any conventional spray drying equipment can be used in the practice of this invention. A spray dryer essentially creates a highly-dispersed liquid state in a high temperature gas zone. The spray drying operation involves atomization or dispersion of the liquid, spray-inert gas mixing, and the drying of the resulting liquid drops. In general, spray dryers consist of a means of atomizing the liquid feed, a source of hot gas, a drying chamber, and a means of separating the dry product from the exhaust gases. The spray dryer may be operated with concurrent or countercurrent gas flow; the use of a countercurrent drying gas flow is preferred for the present purposes.

In the spray drying step, the drying gas, which is preferably air, enters the drying chamber of the spray dryer at a temperature within the range of about 200° C. to 400° C. and preferably abount 220° C. to 250° C. The outlet temperature of the drying gas will range from about 85° C. to 130° C. and preferably from 100° C. to 120° C. It will be understood, however, that the exact temperature of the drying gas is not a critical feature of the present invention, since the temperature need only be high enough to bring about the desired degree of dehydration and will depend to some extent upon the residence time of the drying gas in the drying chamber. In most cases the residence time will be about 0.5 second to 5 seconds. When a hotter gas stream is used, the residence time may be even shorter. In all cases the outlet temperature of the drying gas must be maintained below the decomposition temperature of hexamethylenetetramine. To minimize the cost of the process, the exit gases may be used to pre-heat the incoming drying gas. The spray drying step is ordinarily carried out under ambient pressure.

When the hexamethylenetetramine solution is spray dried under these conditions, the product is a finely-divided solid that contains less than 1 percent and in most cases about 0.1 percent to 0.2 percent by weight of water. This spray-dried material is generally unsatisfactory as a commercial product because it contains a considerable amount of very small particles or dust. It may be screened or subjected to air classification to remove the dust from it and the recovered dust recycled through the spray drying step, but such procedures are time-consuming and economically undesirable. In addition, even when it has been dried to a very low moisture content, the spray-dried product tends to coalesce on storage to a caked form that does not flow freely and thus is difficult to handle.

To avoid these serious handling difficulties, in the process of this invention, the material leaving the spray dryer is fed continuously into a compacting device wherein it is subjected for a short time to a pressure sufficient to cause the finely-divided particles to be formed into a densified homogeneous sheet. Any commercially available compacting equipment can be used to densify hexamethylenetetramine in accordance with the process of this invention. The compacting equipment may be, for example, a rotary press, a roller mill, a compacting mill, or a molding mill. It is preferred to use a compacting mill that comprises a pair of cast steel rolls which are held face to face by a calibrated high tension spring or hydraulic system. The rolls rotate in opposite directions about parallel horizontal axes with the roll surfaces at the nip moving downwardly. If a product having the desired characteristics is to be obtained, the hexamethylenetetramine particles must be subjected to a pressure in the range of about 500 pounds per square inch to 4000 pounds per square inch. Pressures in the range of 1000 pounds per square inch to 2500 pounds per square inch are preferred because they give dense products that suffer little attrition and dusting on handling.

Following the compression step, the sheets of hexamethylenetetramine can be subdivided in any convenient way. A procedure that yields dust-free granular products comprises passing sheets of the compacted hexamethylenetetramine between corrugated rolls set at a small clearance and rotating at different speeds. The corrugations may be a horizontal spiral on one roll and a vertical spiral on the other, giving a square cut between them. The sheets may be fed first to rolls that subdivide them into coarse particles and then to rolls that further reduce their size.

The invention is further illustrated by the example that follows.

EXAMPLE

In a series of runs, hexamethylenetetramine was prepared by the following procedure:

A stream of 45% aqueous formaldehyde solution that had been prepared from deionized water and gaseous ammonia were fed simultaneously and continuously into a reaction vessel at rates that provided a molar ratio of ammonia to formaldehyde of 0.673 to 1.0. The flow rates were adjusted to provide a residence time of about 2–5 minutes in the reactor. The temperature of the reaction mixture was maintained at 70°–75° C. and its pH at 7.5–8.0. The reaction mixture leaving the reactor, which was an aqueous solution containing 28–30% of hexamethylenetetramine, was fed into a spray dryer from which it was discharged as a solid that contained 0.1–0.2% of water. The dried particles were carried pneumatically to a cyclone separator from which the air was exhausted through a water scrubber to the atmosphere and the solids were discharged continuously into a compacting mill. In this mill the hexamethylenetetramine particles were subjected to pressures in the range of 1000 p.s.i.g. to 1500 p.s.i.g. which caused them to be formed into homogeneous sheets. The sheets were passed into a mill where they were broken into granules 100 to 300 microns in size.

The conditions under which the spray drying was carried out and the properties of the products obtained are summarized in the table that follows.

TABLE

| | Run A | Run B | Run C |
|---|---|---|---|
| Spray drying conditions: | | | |
| Inlet air temperature (° C.) | 220 | 220 | 250 |
| Outlet air temperature (° C.) | 100 | 110 | 120 |
| Appearance of Product | (1) | (1) | (1) |
| Analysis of Product: | | | |
| Percent, ash | 0.01 | 0.0 | 0.0 |
| Percent, assay | 99.6 | 99.6 | 99.9 |
| Chlorides, (p.p.m.) | <1 | <1 | <1 |
| Percent, loss on drying | 0.15 | 0.16 | 0.11 |
| Percent, water | 0.15 | 0.09 | 0.10 |
| Solution in water | (2) | (3) | (3) |

1 Fine, white granules.
2 Cloudy.
3 Slightly cloudy.

These products, which are substantially anhydrous, free-flowing, dust-free, and granular, meet all of the specifications that have been established for hexamethylenetetramine.

The terms and expressions which have been employed herein are used as terms of description and not of limitation, and there is no intention in the use of such terms and expressions of excluding any equivalents of the features shown and described or portions thereof. It is recognized that various modifications are possible within the scope of the invention claimed.

What is claimed is:

1. A continuous process for the production of hexamethylenetetramine which comprises the steps of
   (a) continuously introducing into a reaction zone gaseous ammonia and an aqueous solution containing 30 percent to 50 percent by weight of formaldehyde and having a low cation content in the amounts of about 0.67 mole of ammonia per mole of formaldehyde;
   (b) maintaining the reaction mixture formed at a temperature in the range of 50° C. to 90° C. and at a pH of 7 to 8 for from 1 minute to 10 minutes;
   (c) continuously withdrawing the aqueous solution of hexamethylenetetramine formed from the reaction zone;
   (d) feeding said solution to a spray-dryer in which it is atomized;
   (e) contacting the resulting spray with a stream of inert gas preheated to a temperature in the range of about 200° C. to 400° C. for the time required to effect dehydration and solidification of the hexamethylenetetramine in said spray;
   (f) separating finely-divided particles of hexamethylenetetramine that contain less than 1 percent by weight of water from the inert gas stream, said inert gas having been cooled to a temperature below the decomposition temperature of hexamethylenetetramine;
   (g) subjecting said finely-divided particles to a pressure in the range of about 500 pounds per square inch to 4000 pounds per square inch, thereby forming a sheet of densified hexamethylenetetramine; and
   (h) subdividing said sheet into granules.

2. The process of claim 1 wherein the formaldehyde solution used in Step (a) has been prepared from deionized water.

3. The process of claim 1 wherein the reaction of step (b) is carried out at a pH of 7.5 to 8.0 for from 2 minutes to 5 minutes.

4. The process of claim 1 wherein the aqueous solution withdrawn from the reaction zone in Step (c) contains about 25 percent to 35 percent by weight of hexamethylenetetramine.

5. The process of claim 1 wherein in Step (e), the spray is contacted with a stream of air preheated to 220° C. to 250° C. for a period in the range of about 0.5 second to 5 seconds.

6. The process of claim 1 wherein in Step (f) the temperature of the inert gas stream that is separated from the solid product is in the range of about 85° C. to 130° C.

7. The process of claim 1 wherein in Step (f) the temperature of the inert gas stream that is separated from the solid product is in the range of 100° C. to 120° C.

8. The process of claim 1 wherein in Step (f) the finely-divided hexamethylenetetramine particles contain about 0.1 percent to 0.2 percent of water.

9. The process of claim 1 wherein in Step (g) the finely-divided particles are subjected to a pressure in the range of 1000 pounds per square inch to 2500 pounds per square inch.

10. The process of claim 1 wherein in Step (h) the sheet is subdivided into granules ranging in size from about 100 microns to 300 microns.

References Cited

UNITED STATES PATENTS 3,288,790   11/1966   Lefebvre et al.   260—248.6
3,433,863   3/1969   Bowden et al.   264—140

ROBERT F. WHITE, Primary Examiner

J. R. HALL, Assistant Examiner

U.S. Cl. X.R.

260—248.6; 264—14, 140